(12) United States Patent
Meinherz et al.

(10) Patent No.: US 9,939,552 B2
(45) Date of Patent: Apr. 10, 2018

(54) CASCADING OF OPTICAL UNITS OF A LIGHT CURTAIN

(71) Applicant: Rockwell Automation Safety AG, Landquart (CH)

(72) Inventors: Carl Meinherz, Malans (CH); Manford Norbert Stein, Domat (CH); Clau Lombriser, Trun (CH); Martin Hardegger, Sargans (CH)

(73) Assignee: Rockwell Automation Safety AG (CH)

( * ) Notice: Subject to any disclaimer, the term of this patent is extended or adjusted under 35 U.S.C. 154(b) by 177 days.

(21) Appl. No.: 15/002,689

(22) Filed: Jan. 21, 2016

(65) Prior Publication Data
US 2016/0216402 A1    Jul. 28, 2016

(30) Foreign Application Priority Data
Jan. 28, 2015    (EP) .................................... 15152887

(51) Int. Cl.
*G06M 7/00*    (2006.01)
*G01V 8/20*    (2006.01)

(52) U.S. Cl.
CPC ...................... *G01V 8/20* (2013.01)

(58) Field of Classification Search
CPC ... G01V 8/20; G01V 8/10; F16P 3/144; G01J 1/0271
See application file for complete search history.

(56) References Cited

U.S. PATENT DOCUMENTS

| 5,583,334 | A | 12/1996 | Baumann |
| 6,635,862 | B2 | 10/2003 | Shteynberg et al. |
| 6,774,352 | B2 | 8/2004 | Koyama et al. |
| 2001/0040213 | A1* | 11/2001 | Shteynberg .............. G01V 8/20 250/221 |

(Continued)

FOREIGN PATENT DOCUMENTS

| DE | 102013106185 A1 | 12/2014 |
| EP | 2511737 A1 | 10/2012 |

(Continued)

OTHER PUBLICATIONS

Extended European Search Report dated Jul. 24, 2015; European Application No. 15152887.4-1559—(8) pages.

*Primary Examiner* — Thanh Luu
(74) *Attorney, Agent, or Firm* — Boyle Fredrickson, SC

(57) ABSTRACT

The present invention relates to light curtains, in particular safety light curtains, for monitoring a protective field. Furthermore, the present invention relates to optical units which are part of such a light curtain according to the present invention, an optical unit comprises a plurality of radiation emitting and/or radiation receiving elements for transmitting and/or receiving radiation beams forming said light curtain, and an elongated support element forming an outer housing of said optical unit said support element having two opposing peripheral regions which are formed to allow an abutting assembly with another identical optical unit. Said radiation emitting and/or radiation receiving elements are arranged within said support element to form a row, and wherein at least one peripheral one of said radiation emitting and/or radiation receiving elements is located directly adjacent to an outer wall of at least one of said peripheral regions of the support element.

14 Claims, 19 Drawing Sheets

(56) References Cited

U.S. PATENT DOCUMENTS

| | | | |
|---|---|---|---|
| 2007/0069114 A1* | 3/2007 | Clifton | F16P 3/144 250/221 |
| 2007/0170354 A1* | 7/2007 | Schmitz | G01V 8/20 250/227.29 |
| 2016/0139297 A1* | 5/2016 | Guldimann | G01V 8/20 250/221 |

FOREIGN PATENT DOCUMENTS

| | | | |
|---|---|---|---|
| EP | 2808706 A1 | 12/2014 | |
| GB | 2364773 A | 2/2002 | |

* cited by examiner

CASCADING OF OPTICAL UNITS OF A LIGHT CURTAIN

This application claims priority to European Patent Application EP15152887.4, filed Jan. 28, 2015, which is incorporated by reference herein in its entirety.

The present invention relates to light curtains, in particular safety light curtains, for monitoring a protective field. Furthermore, the present invention relates to optical units which are part of such a light curtain and to a method of cascading optical units.

Generally, light curtains detect the movement or intrusion of objects into guarded zones, and more particularly, provide protection for human operators who are working with machines or other industrial equipment.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, a control circuit shuts down the machine, prevents the machine from cycling, or otherwise safeguards the area.

Usually, safety light curtains comprise two optical units (called bars, sticks, or strips), which are formed as two different constructional units, one of the optical units having the functionality of an emitter and one of a receiver. Alternatively, a bidirectional optical communication between the optical units may also take place, as this is shown in EP 2511737 A1. However, for covering a larger area often only one optical unit at each side may not be sufficient. Consequently, it is known to arrange a plurality of optical units in series on both sides of the light curtain. Thereby a plurality of light screens are cascaded together to cooperatively protect an area or machine against unwanted intrusion.

From U.S. Pat. No. 7,329,854 B2 it is for instance known to interconnect the cascaded optical units by means of cables and plug connectors which are arranged at end portions of each optical unit. The disadvantage of this arrangement can be seen in the fact that a significant area remains unguarded in the region where two optical units are joined together.

In order to solve the problem of unwanted gaps in the protective field, DE 20 2008 004 711 U1 proposes to use light deflecting elements for shaping the light path in a way that no gaps are present in the cascaded light screen anymore. However, this arrangement has the disadvantage of being expensive and rather complicated.

EP 2 527 879 A2 on the other hand proposes to cascade individual optical units by means of dedicated upper and lower end elements and one or more intermediate elements which are electrically and mechanically interconnected by means of plug connectors. Each of these elements comprises radiation senders or receivers, respectively. The disadvantage of this solution can be seen in the fact that for a complete cascaded light curtain at least two, normally three different types of optical units are required on each side of the light curtain. Moreover, significant gaps in the cascaded light screen remain in the region of the plug connectors.

The object underlying the present invention is to provide a light curtain and an optical unit for a light curtain, which can be fabricated in a particularly cost-effective way, allow for an accurate alignment and synchronization and is compatible with existing light curtain assemblies.

This object is solved by the subject matter of the independent claims. Advantageous embodiments of the present invention are the subject matter of the dependent claims.

The present invention is based on the idea that a cascadable optical unit of a light curtain monitoring a protective field can be provided by arranging a plurality of radiation emitting and/or radiation receiving elements within an elongated support element forming an outer housing of the optical unit. The support element has two opposing peripheral regions and is formed to allow an abutting assembly with another identical optical unit. According to a first aspect of the present invention, the radiation emitting and/or radiation receiving elements are arranged within said support element to form a row, and at, least one peripheral one of these radiation emitting and/or radiation receiving elements is located directly adjacent to an outer wall of at least one of the peripheral regions of the support element. In this manner, identical optical units can be cascaded without leaving gaps in the light screen at the interfaces between the optical units.

According to an advantageous embodiment of the present invention, the support element comprises a housing body and at least one end cap separate from the housing body. This end cap forms at least one of the walls of said peripheral regions. By this particular housing technique, an assembly of the radiation emitting and/or radiation receiving element close to the peripheral wall is facilitated.

In particular, the end cap comprises fixing means for mechanically fixing two optical units at one another. Such fixing means may for instance be formed as a bracket that interacts with both optical units. Using such a bracket has the advantage that only cheap, simple, purely mechanical components have to be kept on stock in addition to the optical units according to the present invention.

According to an advantageous embodiment of the present invention, the optical unit comprises at least one optical module which carries the radiation emitting and/or radiation receiving elements. The optical module is mounted within the support element in a way that the end cap directly accommodates a distal part of the optical module. Thus, a well defined positioning of the outermost radiation emitting and/or radiation receiving element directly at the peripheral wall of the housing can be achieved.

The end cap may also comprise connecting means for electrically interconnecting at least two optical units according to the present invention. In particular, the optical unit according to the present invention may comprise at least one plug-in unit as shown in EP 2 511 737 A1 which either provides the output of the particular radial of the light curtain, or allows for an electrical interconnection between two optical units. According to the present invention, the plug-in unit is arranged below an electronic circuit carrier, preferably a printed circuit board that carries the radiation emitting and/or radiation receiving elements. Thus, the plug connection does not require any space in the longitudinal direction and a gap between adjacent radiation beams can be prevented.

According to a second aspect, the present invention relates to the cascaded light curtain comprising at least two first optical units, being connected to each other in an interface region to form a first rail of the light curtain, and at least two second optical unit for being mounted opposite to said first optical units, being connected to each other to form a second rail of the light curtain. Each of the interconnected optical units comprises a plurality of radiation emitting and/or radiation receiving elements within an elongated support element forming an outer housing of the optical unit. The support element has two opposing peripheral regions and is formed to allow an abutting assembly with another identical optical unit. As already set forth with regard to the first aspect of the present invention, the radiation emitting and/or radiation receiving elements are arranged within said support element to form a row, and at least one peripheral one of these radiation emitting and/or radiation receiving elements is located directly adjacent to an outer wall of at least one of the peripheral regions of the support element.

The first and second optical rails are formed to be straight or may have one or more angled sections. This is achieved by aligning the optical units in an abutting manner or with their longitudinal axes enclosing an angle. Preferably, this angle is a 90° angle. Thereby a high flexibility regarding the shape of the protective field to be monitoring can be achieved. Moreover, even comparatively large protective areas can be covered without the need to provide extensively large integral housings.

According to the present invention, the radiation emitting and corresponding radiation receiving elements can be aligned in a way that the radiation beams do not enclose a 90° angle with the longitudinal axis of the first and second rails, so that it is not the directly opposing receiver which is evaluated, but a receiver that is located at a different position of the corresponding opposing rail. The cascaded light curtain according to the present invention allows for this pattern to be continued with out a gap even at the interface regions between two optical units. In particular, at peripheral one of the radiation emitting and/or radiation receiving elements of a first optical unit is configured to interact with a peripheral one of the radiation emitting and/or radiation receiving elements arranged in one of the second optical unit which is not directly opposing said first optical unit. Hence, from a performance standpoint the cascaded light curtain is providing a radiation beam pattern which exactly emulates a single part optical rail. No gaps are present which would lead to a safety hazard.

A particularly uniform radiation field can be provided by ensuring that the resolution between the peripheral radiation emitting and/or radiation receiving elements of two abutting optical units is essentially equal to the resolution between adjacent radiation emitting and/or radiation receiving elements within the same optical unit.

According to the present invention, the abutting optical units are fixed at each other via end caps which are provided at the peripheral regions of each of said abutting optical units. Such a construction leads to a particularly accurate alignment between the interconnected optical units. Moreover, by additionally using brackets that interact with said end caps out particularly versatile and flexible manner of assembly is achieved.

The advantages of the present invention take effect most clearly when using same with optical units that have combined transceiver elements on both rails of the light curtain. Such a technique is for instance described in EP 2 511 737 A1. However, it is clear for a person skilled in the art that the cascading technique according to the present invention can also be used for arrangements that have dedicated receiver and emitter optical units, respectively.

As already mentioned, a cascaded light curtain according to the second aspect of the present invention can also have an angled shape. For realizing an L-shaped bend, one optical unit is attached to another optical unit so that a peripheral end of one support element is abutting to an end region of a side wall of the other support element. Advantageously, this arrangement leads to a row of radiation emitting and/or radiation receiving elements with the same distance as between the radiation emitting and/or radiation receiving elements within each optical unit. No gaps are formed at the corner region of the L-shaped bend. This equidistant layout can in particular be reached when, for each of said optical units, the distance between the peripheral ones of said transceiver elements and the peripheral wall of said support element is different for the two ends of each optical unit.

The present invention further relates to a method for cascading at least two optical units of a light curtain monitoring a protective field, said optical units comprising a plurality of radiation emitting and/or radiation receiving elements for transmitting and/or receiving radiation beams forming said light curtain, and an elongated support element forming an outer housing of said optical unit, said support element having two opposing peripheral regions. According to the present invention, said method comprises the step of arranging said optical units in an abutting configuration to form a rail of the light curtain, so that a resolution between peripheral radiation emitting and/or radiation receiving elements of the two abutting optical units is essentially equal to a resolution between adjacent radiation emitting and/or radiation receiving elements within the same optical unit.

The accompanying drawings are incorporated into and form a part of the specification to illustrate several embodiments of the present invention. These drawings together with the description serve to explain the principles of the invention. The drawings are merely for the purpose of illustrating the preferred and alternative examples of how the invention can be made and used and are not to be construed as limiting the invention to only the illustrated and described embodiments. Furthermore, several aspects of the embodiments may form—individually or in different combinations—solutions according to the present invention. Further features and advantages will become apparent from the following more particular description of the various embodiments of the invention, as illustrated in the accompanying drawings, in which like references refer to like elements, and wherein:

Figure 1:
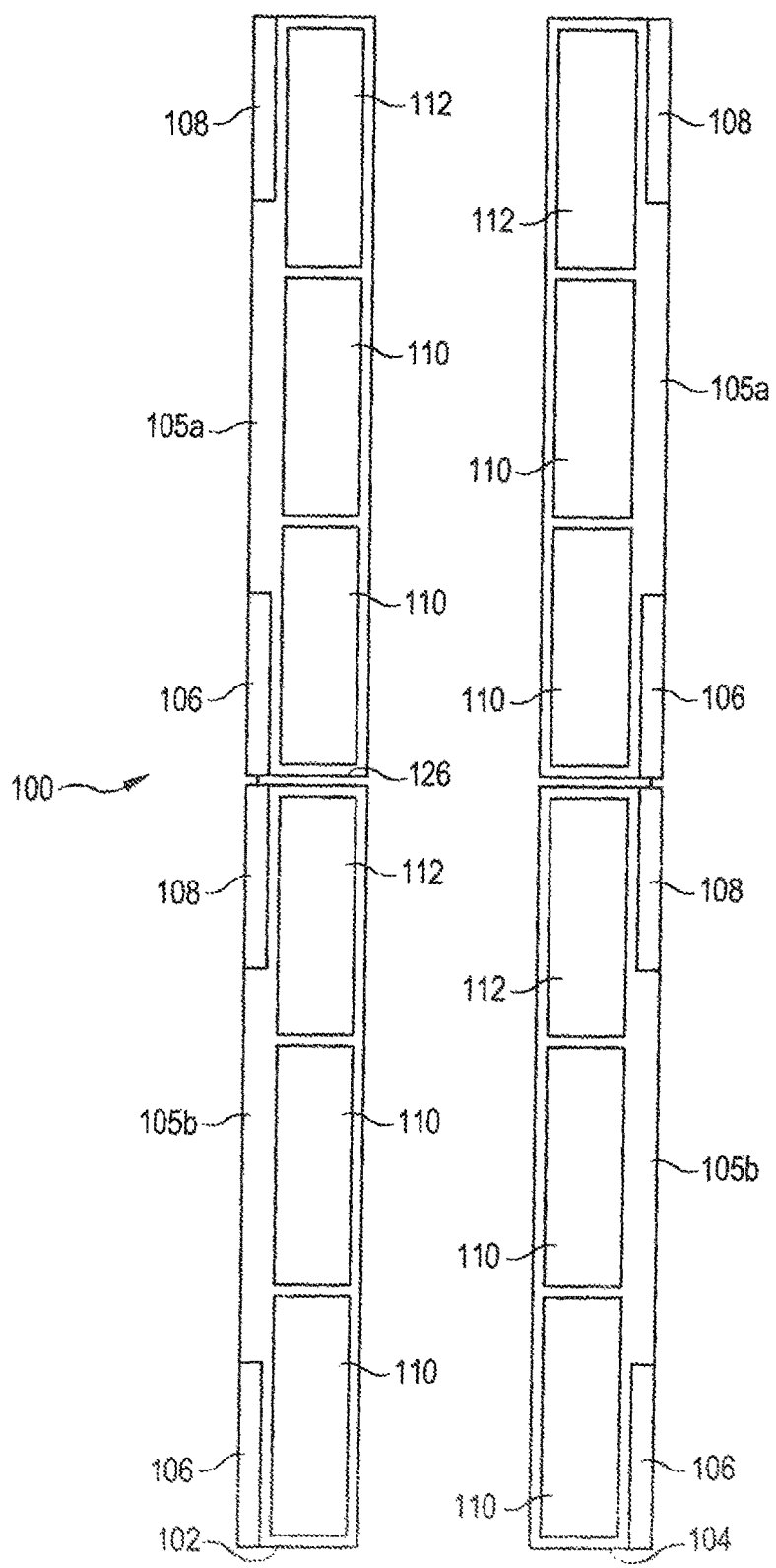
FIG. 1 shows a schematic representation of two opposing rails comprising cascaded optical units according to the present invention.

The present invention will now be explained in more detail with reference to the figures. Referring now to FIG. 1, a schematic representation of a light curtain 100 is shown which comprises two opposing optical rails 102, 104, each comprising two cascaded optical units 105. Of course, the ideas of the present invention are also applicable in systems which comprise more than two optical units.

The optical rails 102, 104 form between each other a plurality of light barriers for monitoring a protective field.

The optical units 105 may for instance be formed according to the principles of the European patent application EP 2511737 A1, and may in particular use plug-in modules 106, 108 for defining their respective functionality. However, according to the present invention, also optical units which are not identically built can be used advantageously. For instance, the optical units belonging to opposing optical rails 102, 104 can be configured in a way that a light emitting element arranged in one optical rail opposes a light receiving element in the other optical rail. In this case, the light barriers extend essentially at right angles to a longitudinal axis of the optical rails.

According to the embodiment shown in FIG. 1, each optical unit 105 comprises two identical modules 110 each having light emitting and light receiving elements. These optical modules 110 are identically built for all optical units 105. Each of the optical units 105 further comprises at least one second optical module 112 that additionally comprises a micro controller providing the necessary intelligence to the optical unit 105. Each of the modules 110, 112 may for instance have a height of about 150 mm. However, any other size or number of modules within each optical unit 105 can also be used together with the present invention. Essentially, the first and second optical units 105 are identically built except for the plug-in modules 106a, 106b and 108a, 108b which are defining the particular functionality of each of the optical units.

Each of the optical modules 110 may comprises a plurality of transceiver elements with their associated circuitry for emitting and sensing the radiation beams. The second optical module 112 contains the same optical functions and additionally, at least one micro controller and optionally electronic circuitry, such as an interface with an external connector. However, for using the cascading according to the present invention, the transceiver elements do not necessarily have to be grouped in optical modules 110, 112.

Figure 2:
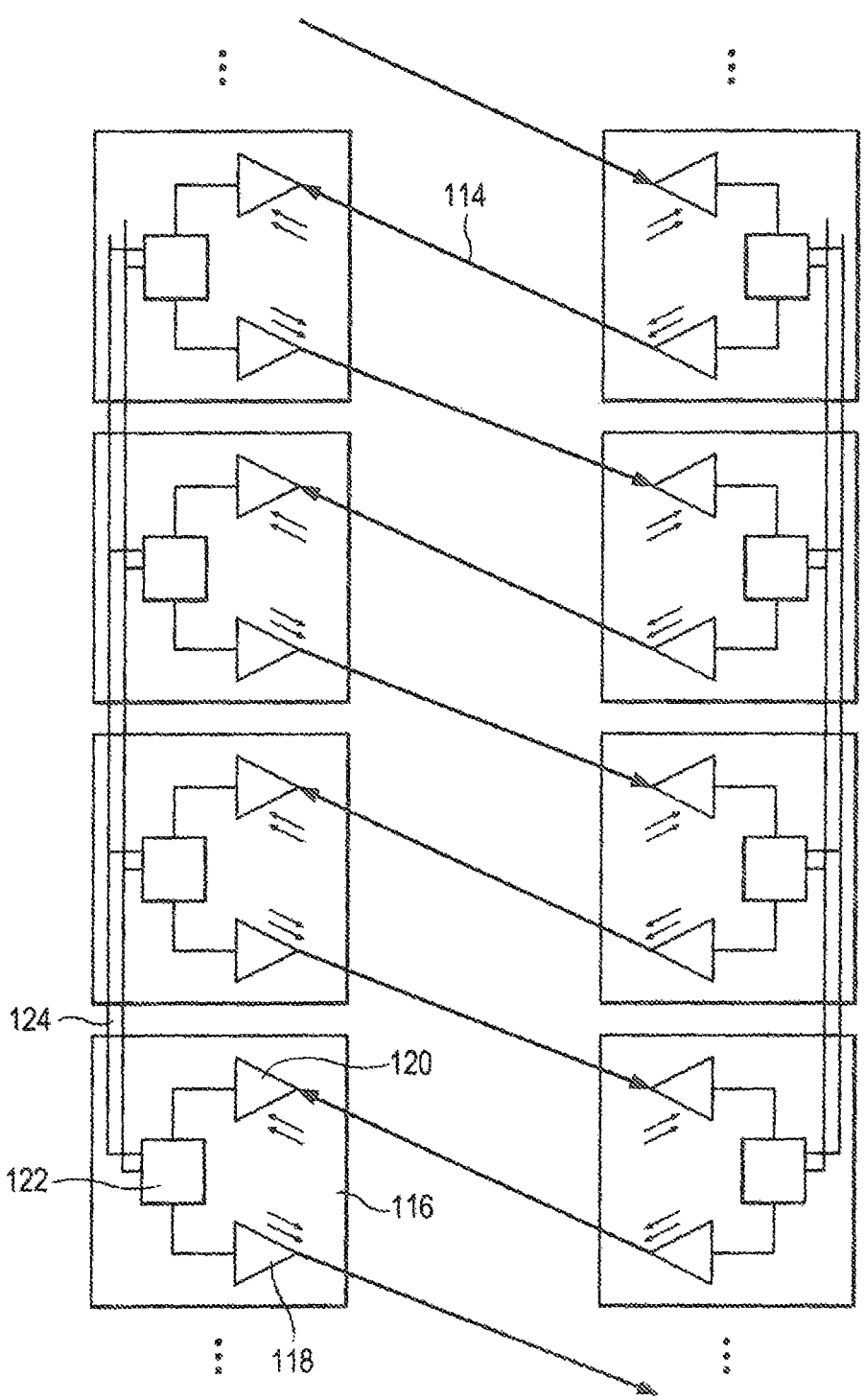
FIG. 2 shows a schematic representation of the light screen formed by radiation emission and receiving between opposing optical units.

A more detailed view of a part of two opposing optical modules 110 is given with reference to FIG. 2. The light curtain may be formed by a linear array of radiation beams 114 which preferably is infrared radiation with a wavelength between about 800 nm and 1000 nm, or visible light having a wavelength between about 620 nm and 750 nm. Any other suitable radiation may also be used according to the principles of the present invention.

The radiation beams 114 may for instance be activated sequentially, one beam at a time, from one peripheral end to the other peripheral end of each stick. Because each optical unit 105 has transmitting and sensing photo elements, the scan through the light curtain activates every element sequentially and with an alternating direction, the beam being sent from the second optical rail 104 to the first optical rail 102 and back again. During such a scan sequence, the respective receiving rail always only sequentially detects the light from the predetermined emitting element to the corresponding receiving element. In order to allow for such a complex scan procedure, each optical unit 105 is formed by a plurality of transceiver elements 116 each comprising at least one light-emitting element 118 and at least one light-receiving element 120.

Each of the transceiver elements 116 has a rather high degree of integrated intelligence in the form of a separate control element 122 which may for instance be formed as an integrated circuit, such as an application specific integrated circuit (ASIC). Each of the control elements 122 provides electronic circuitry for driving the at least one light-emitting element 118 and for processing signals generated by the at least one light-receiving element 120. In order to communicate with the higher level controller, each of the transceiver elements 116 is connected to a communication bus 124.

Moreover, each transceiver element contains the driver and receiving circuitry which is needed for accurately performing the complex emitting and detecting sequences performed by the light curtain of FIGS. 1 and 2.

As depicted schematically in FIG. 2, each radiation emitting element 118 directs its radiation beam 114 not to the radiation receiving element 120 which is directly opposite to the respective radiation emitting element, but to a radiation receiving element being offset in the longitudinal direction of the optical rail 102, 104. According to the present invention, the transceiver elements 116 are arranged close to the peripheral walls 126 of each optical unit 105. Thereby, the optical units 105 can be cascaded in a way that no gaps between the radiation beams 114 occur: the radiation emitting element of one optical unit 105 emits radiation towards a radiation receiving element which belongs to an optical unit 105 not directly opposite to the one wherein the radiation emitting demerit is located. Such a seamless transition from one optical unit 105 to the next can be achieved firstly by providing the respective geometric design. Secondly, by providing a bus structure 124 together with a relatively high intelligence in the transceiver elements 116, also the signaling along each of the optical rails 102, 104 emulates a rail with an uninterrupted row of transceiver elements 116.

Figure 3:
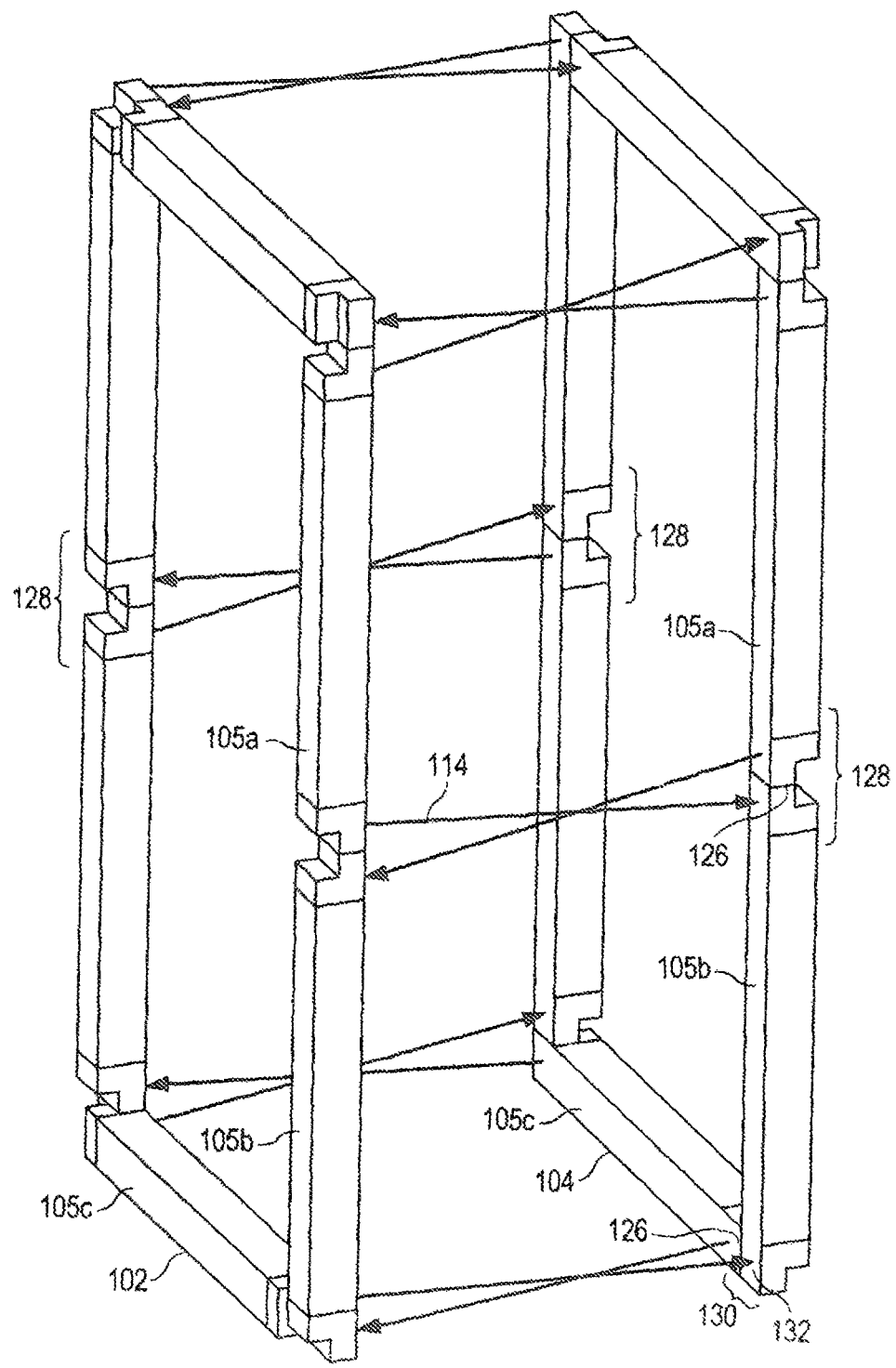
FIG. 3 shows a schematic representation of a cascaded light curtain according to the present invention.

FIG. 3 illustrates schematically the cascading of plurality of opposing optical units 105 in a linear as well as an angled manner. Each of the rails 102, 104 has a rectangular outline, the second optical rail 104 mirroring the outline of the first optical rail 102. Of course, the number of optical units 105 which are cascaded is essentially arbitrary, so that the outline of the optical rails 102, 104 can be adapted to a wide range of protection fields. According to the present invention, the radiation beams 114 are not sent directly to the opposing optical unit, but to the adjacent one. This is possible, because the radiation beams 114 are not transmitted with a 90° angle to the longitudinal axis of the optical unit 104, but in a slightly oblique manner. For the sake of clarity, in the figure only those radiation beams are shown which are passing over the areas of cascading.

In a linear cascading area 128 two optical units 105 are arranged to be abutting with their peripheral walls 126. According to the present invention, the radiation emitting/receiving elements are arranged directly adjacent to the peripheral walls 126. Thus, the radiation beam 114 which is emitted by the upper optical unit 105a of the first optical rail 102 can be detected by the peripheral radiation receiving element of the lower optical unit 105b of the second optical rail 104. In the same manner, the radiation beams directed from the second optical rail 104 towards the first optical rail 102 cross over from the upper optical unit 105a of the second optical rail 104 to the lower optical unit 105b of the first optical rail 102.

Of course, the direction of the radiation beams 114 can also be directed from the lower optical unit upwards as this is shown schematically for the linear cascading area 128 located in the background of the perspective drawing of FIG. 3.

Due to the crossing over between optical units 105 not directly corresponding, an uninterrupted continuous sequence of radiation beams leads to a gap free light curtain which can be built to fit any desired size of protection area. The same effect can also be reached for angular cascading areas 130.

In case of an angular cascading, in particular a 90° L-shaped connection, two optical units 105 according to the present invention are connected to each other in an abutting manner by attaching the end wall 126 of one of the optical units to a peripheral side wall 132 of the other optical unit. As the respective radiation emitting/receiving elements are arranged close to the peripheral end wall 126 and side wall 132 of the optical unit 105, the radiation beam from the horizontal optical unit 105c can be received and evaluated by the vertical optical unit 105b of the respective opposing optical rail and vice versa.

Consequently, also for an L-shaped cascaded geometry a gap less light curtain can be achieved in a particularly easy manner.

Figure 4:
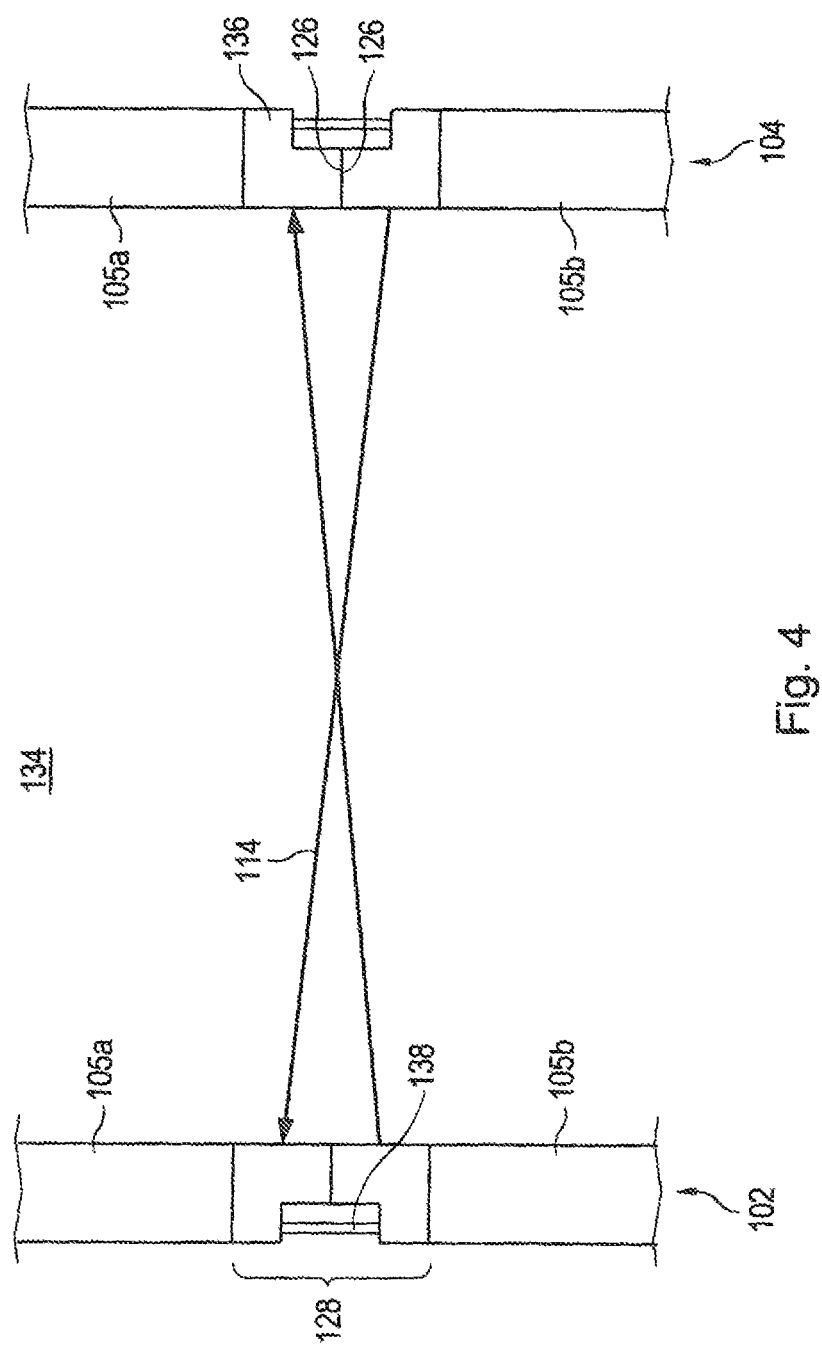
FIG. 4 shows a schematic representation of an interface region at abutting optical units forming a straight rail.

FIG. 4 schematically shows a detail of FIG. 3 in order to explain the linear cascading area 128 in more detail. As already described with reference to FIG. 3, two optical rails 102, 104 are opposing each other and exchange radiation beams 114 for forming a light curtain that monitors the protective field 134 for any undesired intrusion. Although in the figure only a linear cascading in a vertical direction is shown, it is clear for a person skilled in the art that the principles of the present invention are by no means restricted by the orientation of the rail in space. In particular, also horizontal or diagonal optical rails can be cascaded according to the present invention.

For a linear cascading, two optical units 105a and 105b are connected to each other with their peripheral end walls 126 being adjacent. According to the present invention, the respective radiation emitting and radiation receiving elements are arranged so closely to the peripheral end walls 126 that the distance between the outermost radiation emitting/receiving elements of two abutting optical units 105a, 105b essentially equals the distance of the so transceiver elements 116 within the same optical unit. Therefore, the radiation beams 114 are emitted to bridge the distance to the respective non-opposing optical unit. The result is a continuous row of radiation beams which may be activated at different times and do not leave any gap.

As will become apparent more clearly with reference to FIGS. 17 to 20, the peripheral regions of each optical unit 105 are partly formed by an end cap 136. The end caps 136 allow a precise alignment of the abutting optical units 105 with respect to each other. Moreover, the end caps 136 may provide fixing means for securing the optical unit 105 at each other. Connecting means 138 may be provided for establishing the electrical contact between two cascaded optical units.

FIGS. 5 to 8 illustrate that the linear cascading according to the present invention is able to meet the applicable safety regulation requirements. In order to test the performance regarding the resolution of a light curtain arrangement, usually so called test rods 140 are positioned within the optical path of the radiation beams. The dimensions of the test rod 140 are related to the respective resolution that has to be ensured by the light curtain. Standard resolutions are for instance 14 mm and 30 mm, others are also possible. The length of a test rod is defined by the standard as having a minimum effective length of 150 mm. Accordingly, the test rod 140 may have a diameter D of 14 mm or 30 mm, and a length L of 160 mm. FIGS. 5 to 8 schematically show a test rod 140 with a diameter D of 30 mm. The length L is 150 mm, but is not represented true to scale in the Figures.

Figure 5:
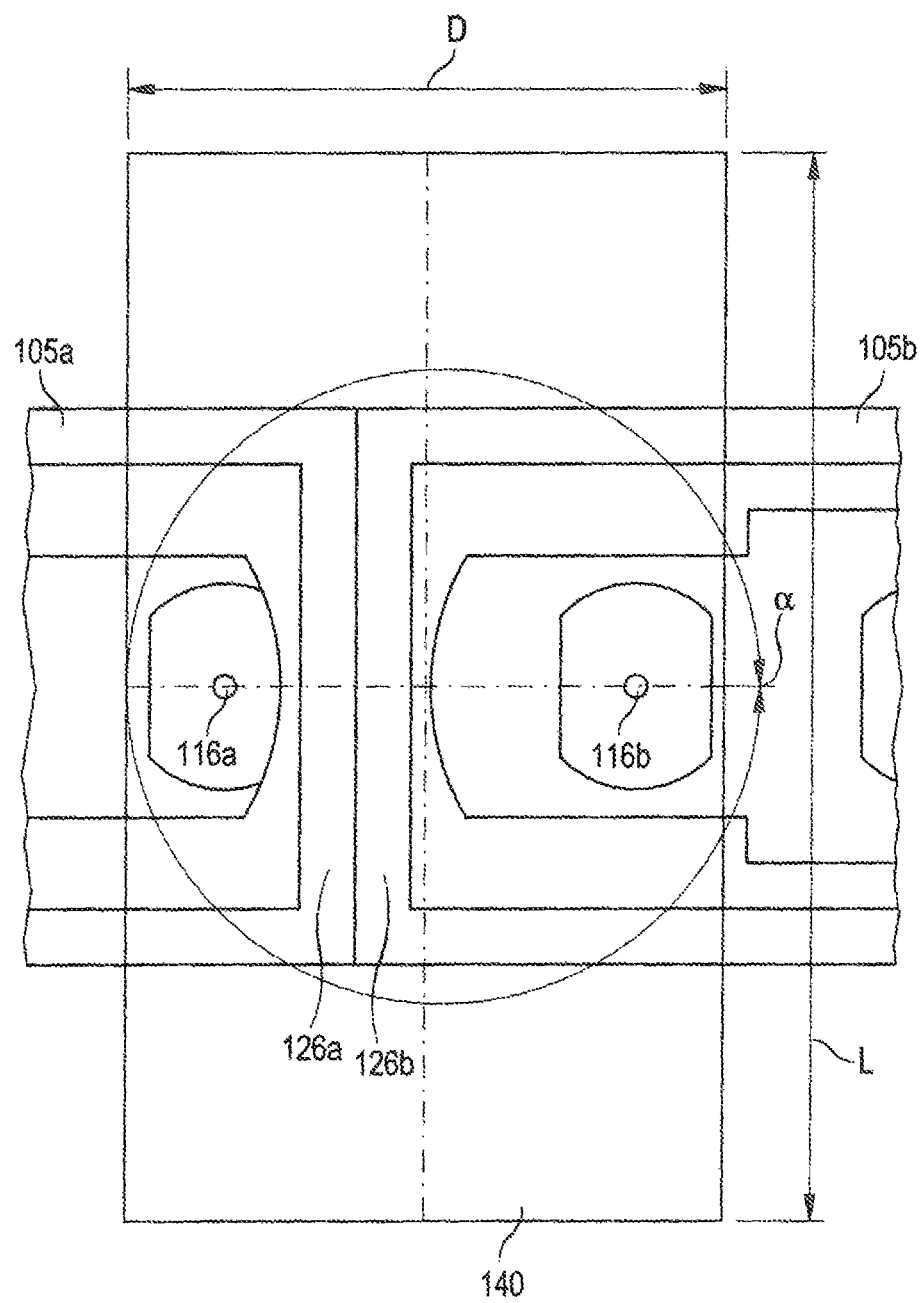
FIG. 5 shows a detail of the interface region of FIG. 4 with 30 mm test rod that is rotated by 0°.
Figure 6:
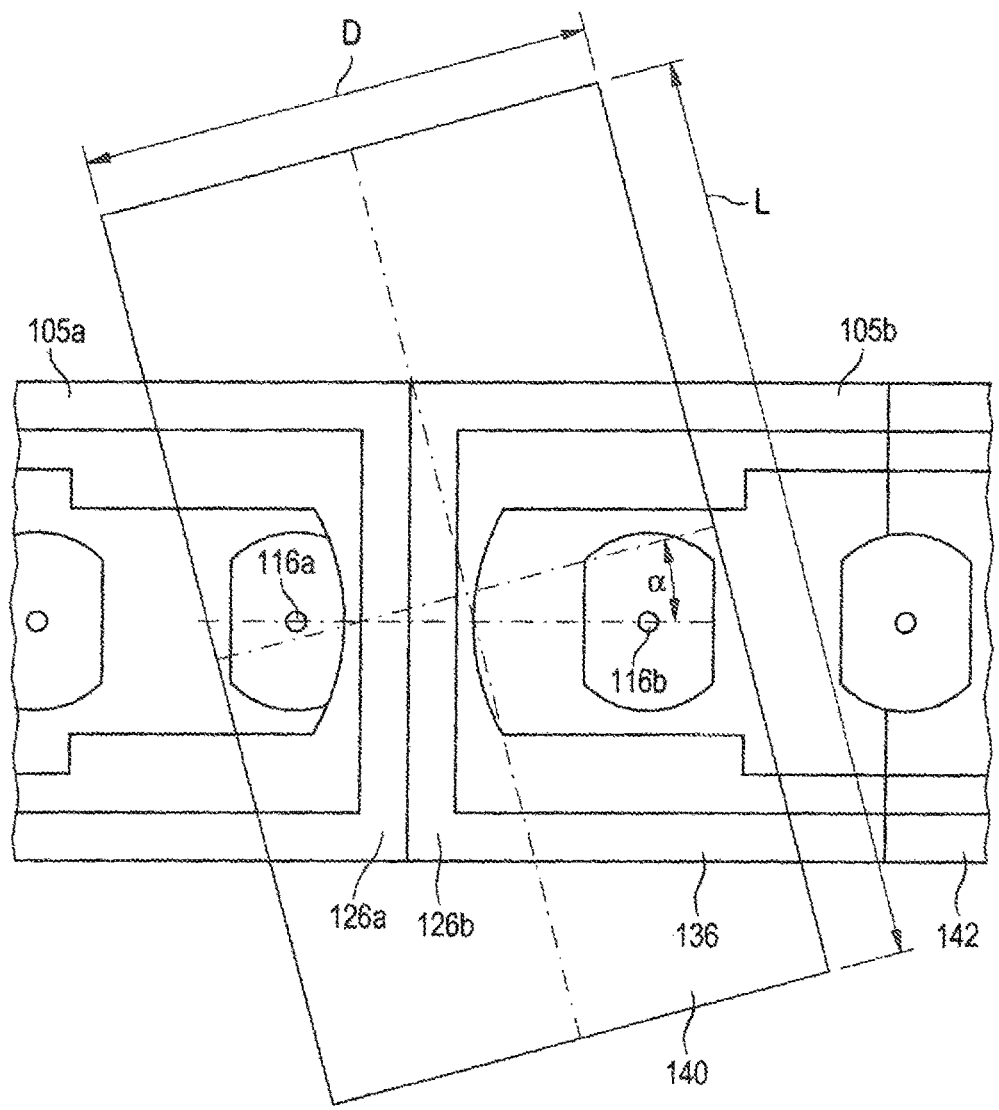
FIG. 6 shows a detail of the interface region of FIG. 4 with 30 mm test rod that is rotated by 15°.

FIG. 5 shows the linear cascading area 128 where two optical units 105a, 105b are in abutting contact with their peripheral end walls 126a, 126b. Each of the optical units 105a, 105b has a plurality of transceiver elements 116 that are arranged along a longitudinal axis of the optical units in a serial row. In the position shown in FIG. 5, the test rod 140 includes with its cross section an angle α of 0°. It can be seen that the distance between the outermost transceiver elements 116a, 116b of the optical units 105a, 105a, respectively, is small enough to be covered completely by the test rod's diameter D. When tilting the test rod 140 by increasing the angle α to a value of 15° as shown in FIG. 6, still just those two transceiver elements 116a, 116b are covered by the test rod 140.

According to the particular embodiment shown in FIGS. 5 to 8, the optical units are built in a form that the peripheral transceiver element at one peripheral end of the optical unit is closer to the peripheral end wall than the other. Thereby, the distance between the peripheral transceiver elements 116a, 116b is almost the same as the distance between two adjacent transceiver elements within one optical module.

Figure 7:
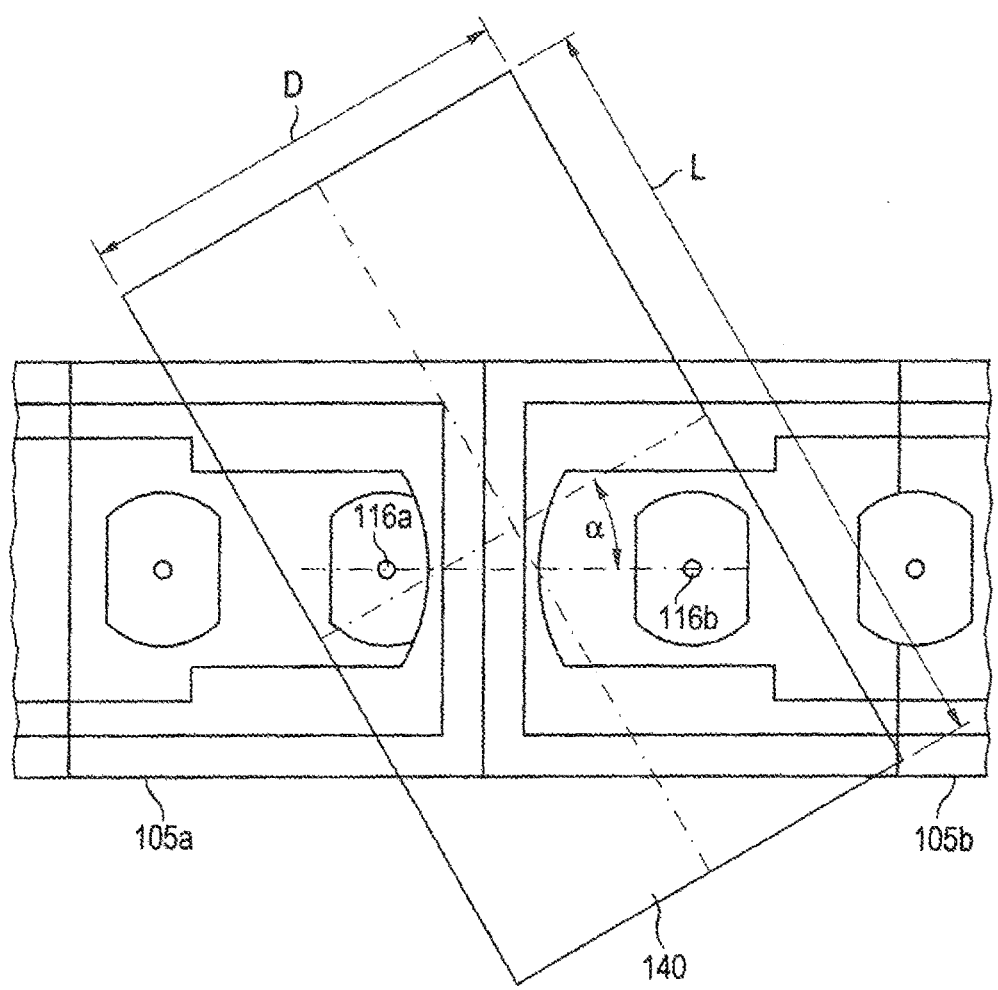
FIG. 7 shows a detail of the interface region of FIG. 4 with 30 mm test rod that is rotated by 30°.
Figure 8:
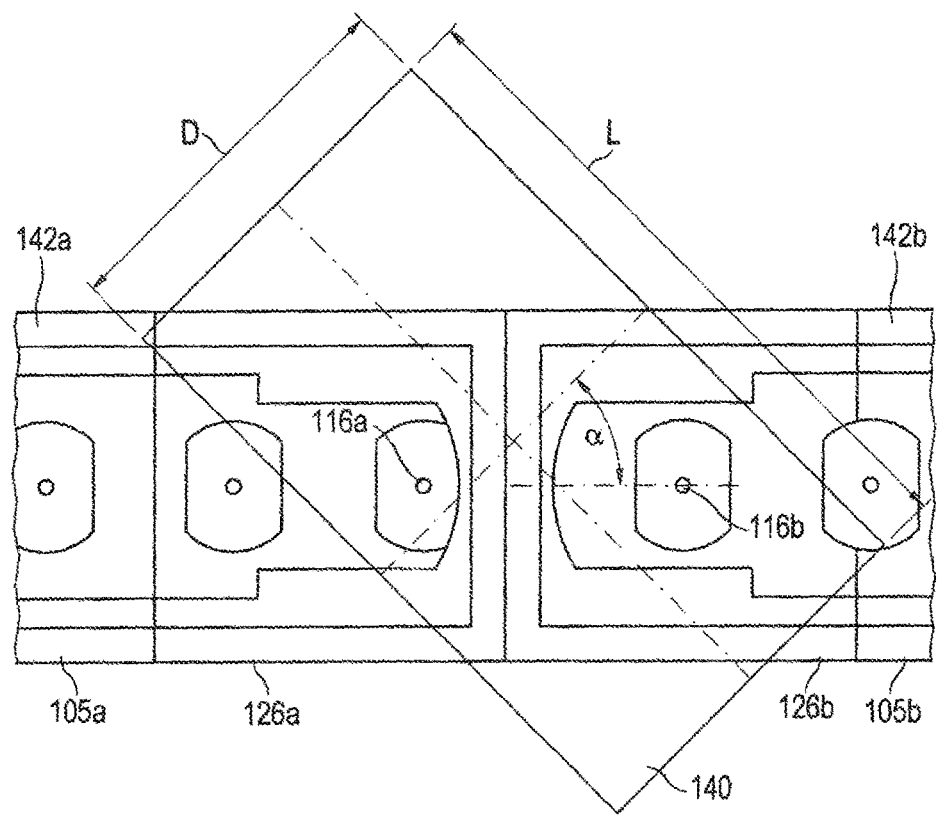
FIG. 8 shows a detail of the interface region of FIG. 4 with 30 mm test rod that is rotated by 45°.

As this will be explained in more detail with reference to FIGS. 17 to 22, the transceiver elements are mounted in the housing that is formed from a housing body 142 and a separate end cap 136. FIG. 7 shows the arrangement of FIG. 5 for a tilting angle α of 30°, whereas FIG. 8 shows the arrangement of FIG. 5 for a tilting angle α of 45°. In both cases, the test rod 140 still covers both peripheral transceivers 116a, 116b of the cascaded optical units 105a, 105b.

Figure 9:
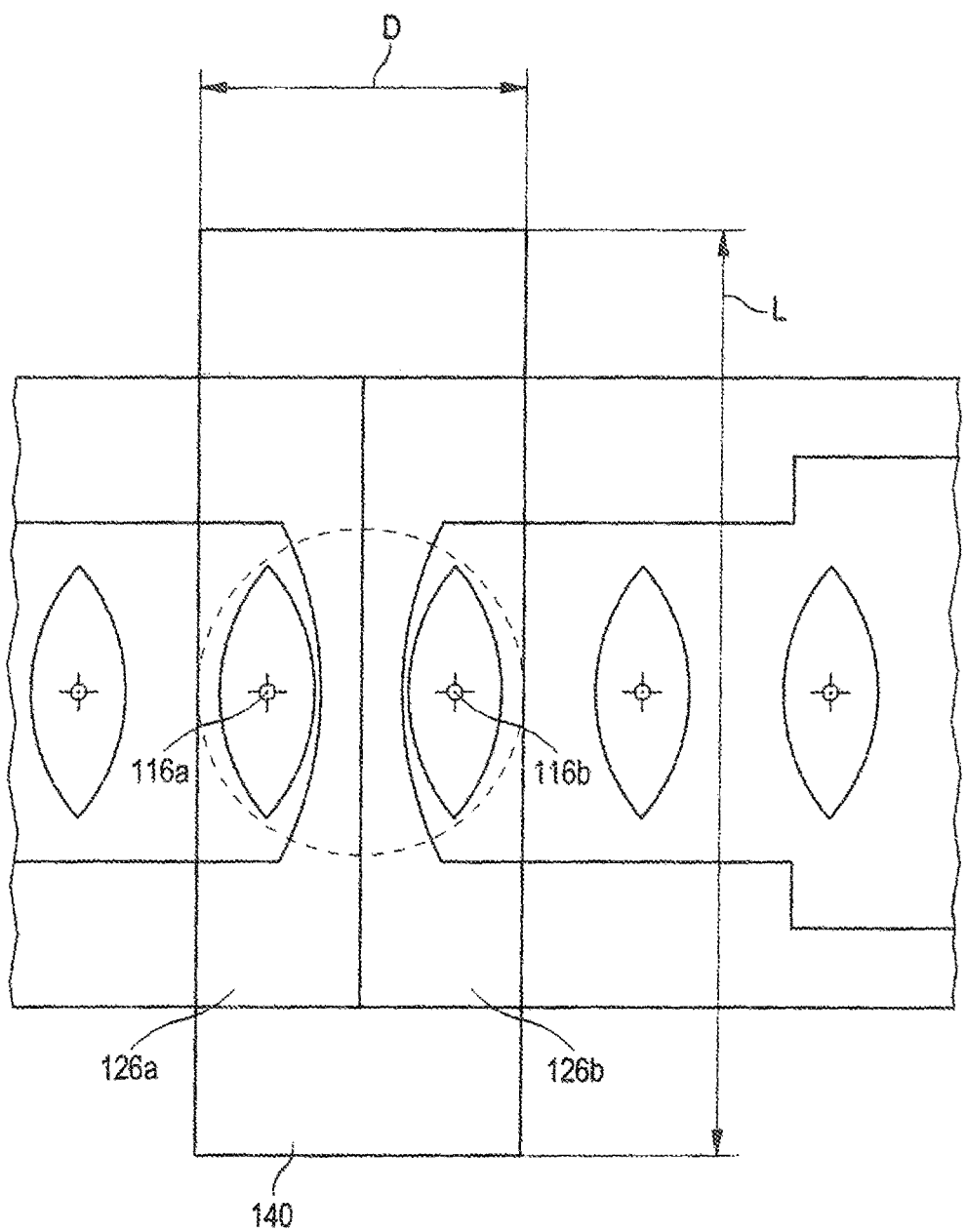
FIG. 9 shows a detail of the interface region of FIG. 4 with 14 mm test rod that is rotated by 0°.
Figure 10:
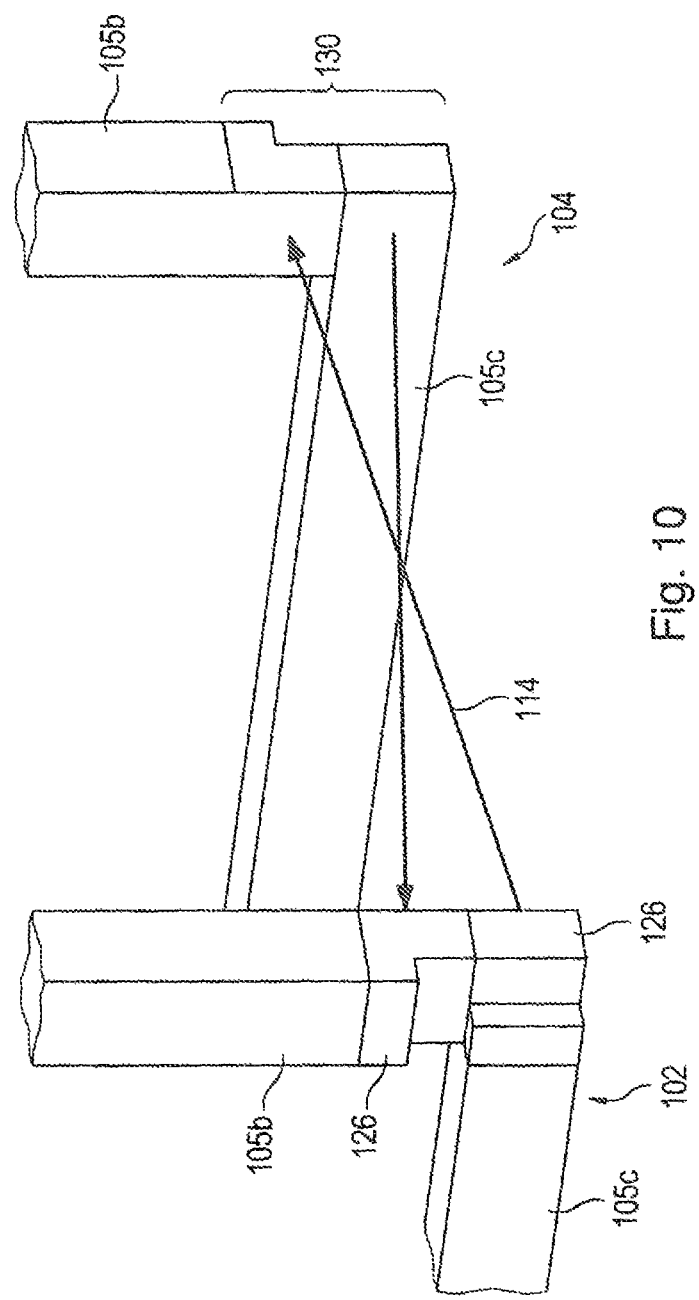
FIG. 10 shows a schematic representation of an interface region at abutting optical units forming an angled rail.

FIG. 9 schematically shows the linear cascading area 128 where two optical units 105a, 105b are in abutting contact with their peripheral end walls 126a, 126b for the case where the resolution of 14 mm is reached. Analog to the arrangement of FIG. 5 showing the case of a resolution of 30 mm, each of the optical units 105a, 105b has a plurality of transceiver elements 116 that are arranged along a longitudinal axis of the optical units in a serial row. In the position shown in FIG. 9, the test rod 140 includes with its cross section an angle α of 0°. It can be seen that the distance between the outermost transceiver elements 116a, 116b of in the optical units 105a, 105a, respectively, is small enough to be covered completely by the test rod's diameter D which in FIG. 9 is 14 mm. Of course, any other required resolution can also be achieved by using the cascading technique according to the present invention, FIG. 10 shows as a further detail of FIG. 3 an angular cascading area 130 between a vertical optical unit 105b and a horizontal optical unit 105c. As already mentioned with reference to FIG. 3, the vertical optical unit 105c and the horizontal optical unit 105b are aligned to each other so that the peripheral end wall 126 of one of the optical units is abutting with the peripheral side wall 132 of the respective other optical unit.

According to the present invention, the radiation beam 114 which is emitted by the outermost transceiver element of the horizontal optical unit 105c is directed towards the outermost transceiver element of the vertical optical unit 105b at the opposing optical rail 102, 104. The direction of the light path may of course also be exactly opposite to the one shown in FIG. 9, i.e. the radiation beam 114 can also be emitted by the respective vertical optical unit 105b.

Figure 11:
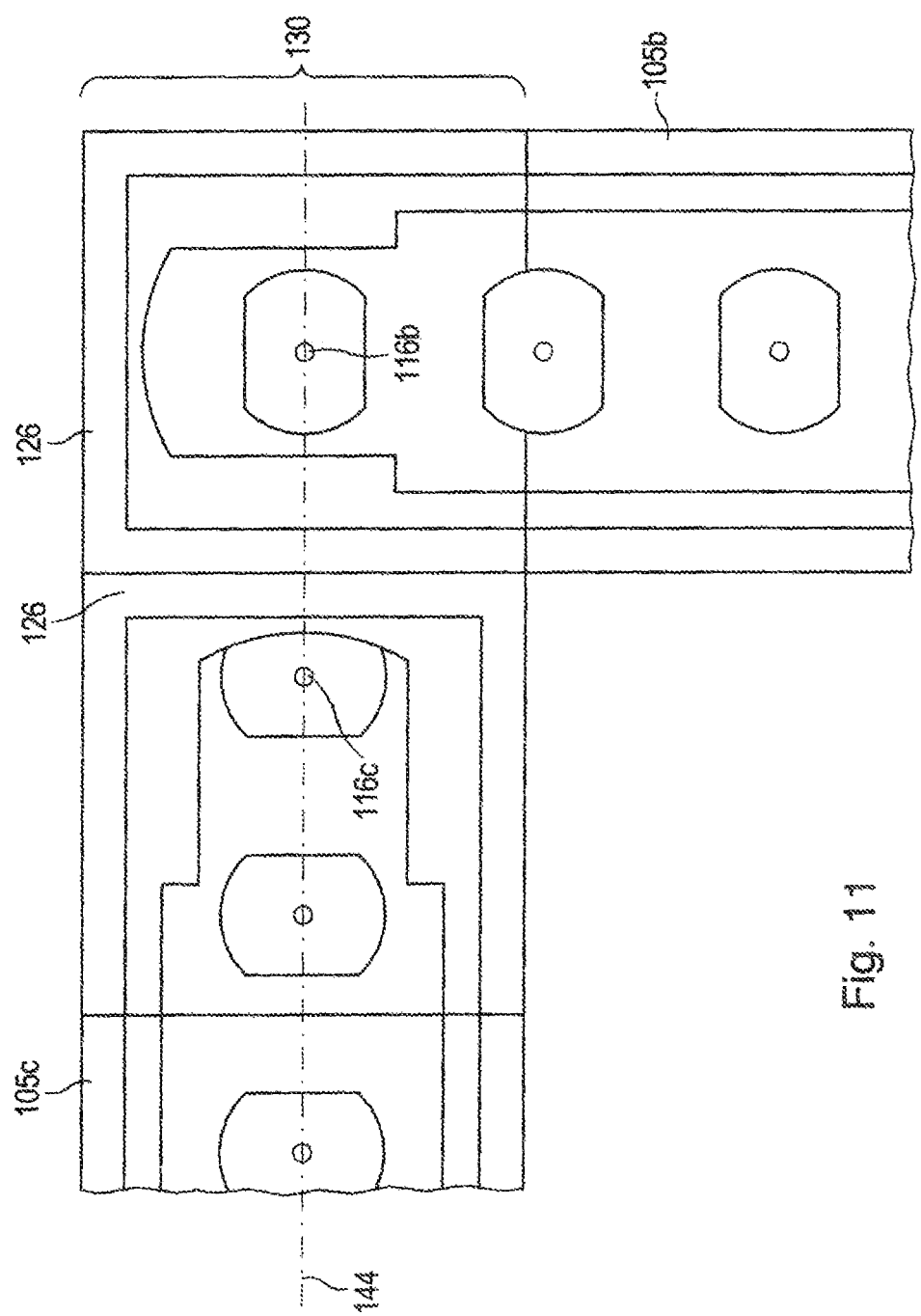
FIG. 11 shows a top view of a correctly aligned angled interface region according to the present invention.
Figure 12:
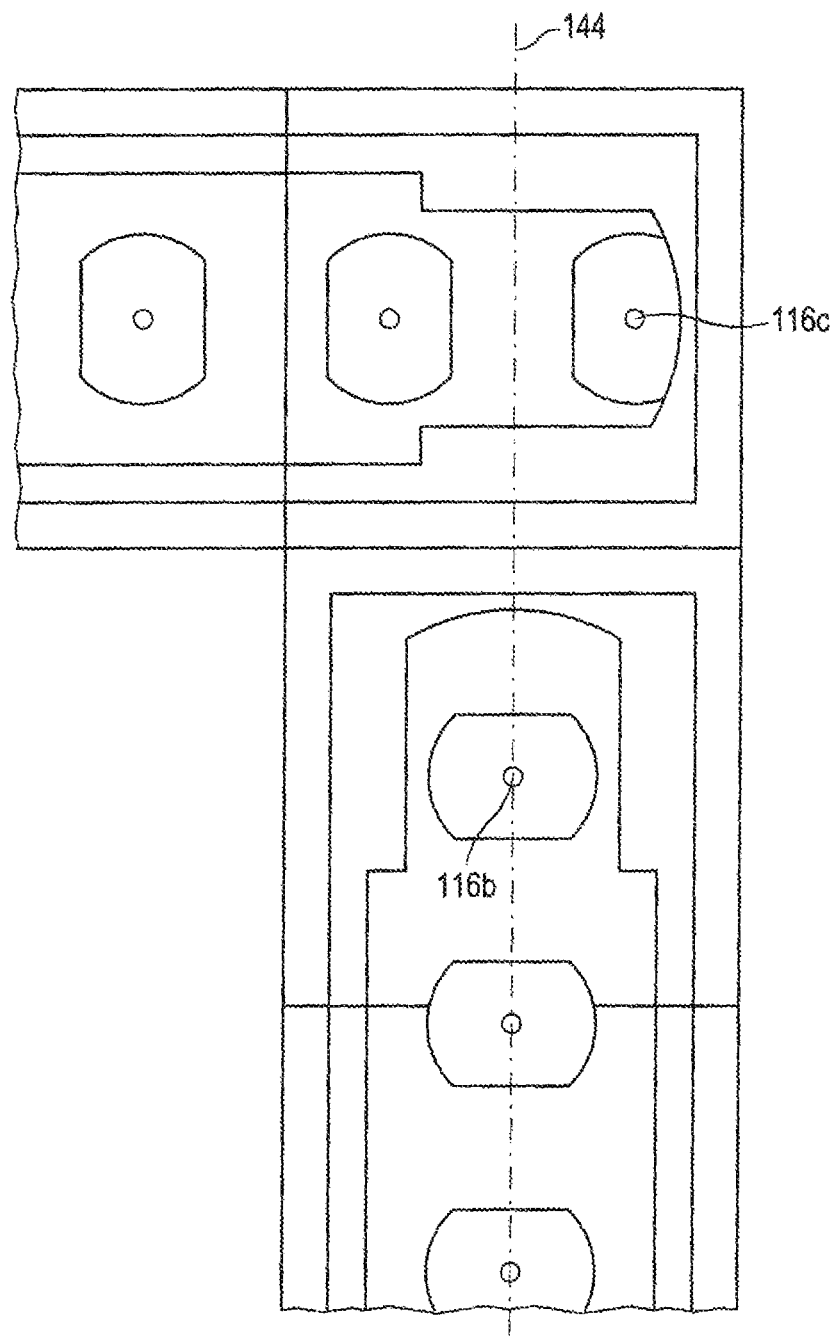
FIG. 12 shows a top view of an incorrectly aligned angled interface region

FIGS. 11 and 12 explain the correct alignment of two optical units 105b and 105c in an L-shaped cascaded arrangement. According to an advantageous embodiment of the present invention, the most peripheral transceiver element 116 does not have the same distance to the peripheral end wall 126 for both ends of an optical unit. In particular, at one end the transceiver element 116 is mounted at the smallest possible distance to the peripheral end wall 126, whereas at the other end a defined distance is kept between the peripheral end wall 126 and the transceiver element 116. This distance is chosen in way that the peripheral transceiver element 116b of one of the optical units 105b is aligned along the longitudinal axis 144 of the other optical unit 105c. Moreover, the distance between the two peripheral transceiver elements 116b and 116c is essentially the same as the distance between two adjacent transceiver elements within one optical unit 105.

Using this particular arrangement, a continuous radiation curtain for monitoring the protective field between the two optical rails 102, 104 can be achieved. Advantageously, no gaps are present even in the angular cascading area 130.

FIG. 11, on the other hand, shows an incorrect alignment of the two angularly cascaded optical units. As can be seen from this figure, the peripheral transceiver elements 116c and 116b are not aligned on one common longitudinal axis 144. Consequently, no continuous L-shaped row of transceiver elements is formed in contrast to the arrangement of FIG. 10.

Figure 13:
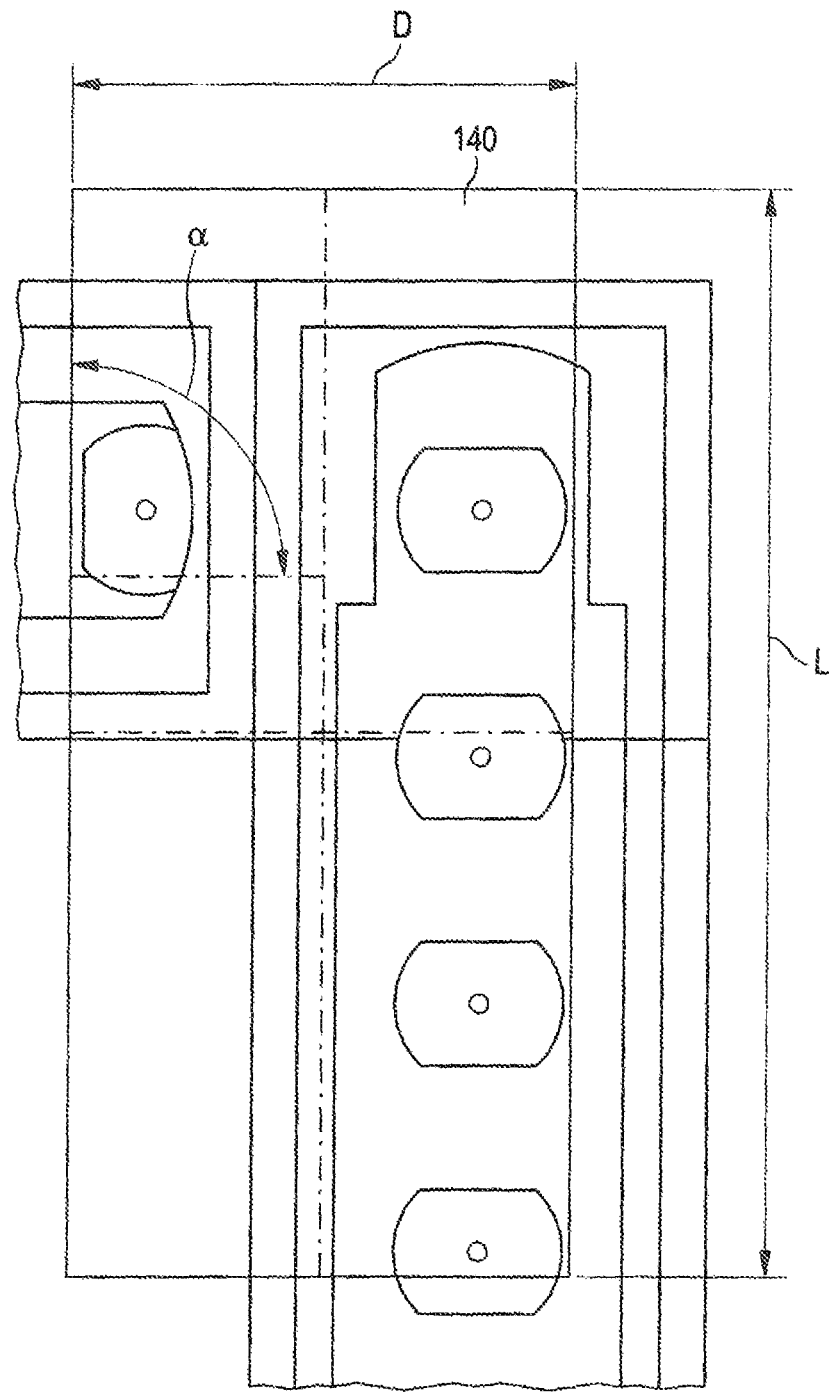
FIG. 13 shows a detail of the interface region of FIG. 10 with 30 mm diameter test rod that is rotated against a first optical unit by 90°.
Figure 14:
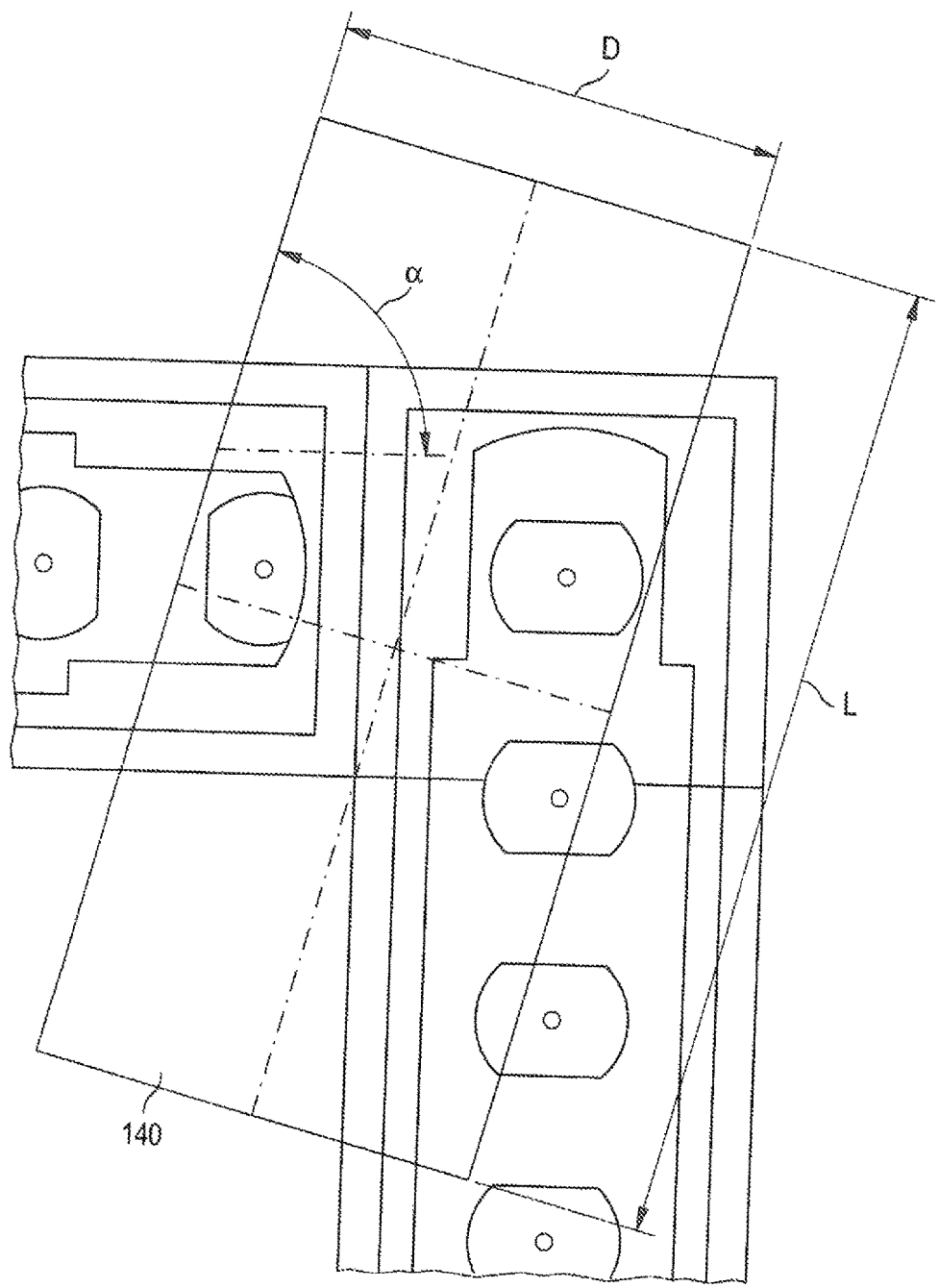
FIG. 14 shows a detail of the interface region of FIG. 10 with 30 mm diameter test rod that is rotated against the first optical unit by 75°.
Figure 15:
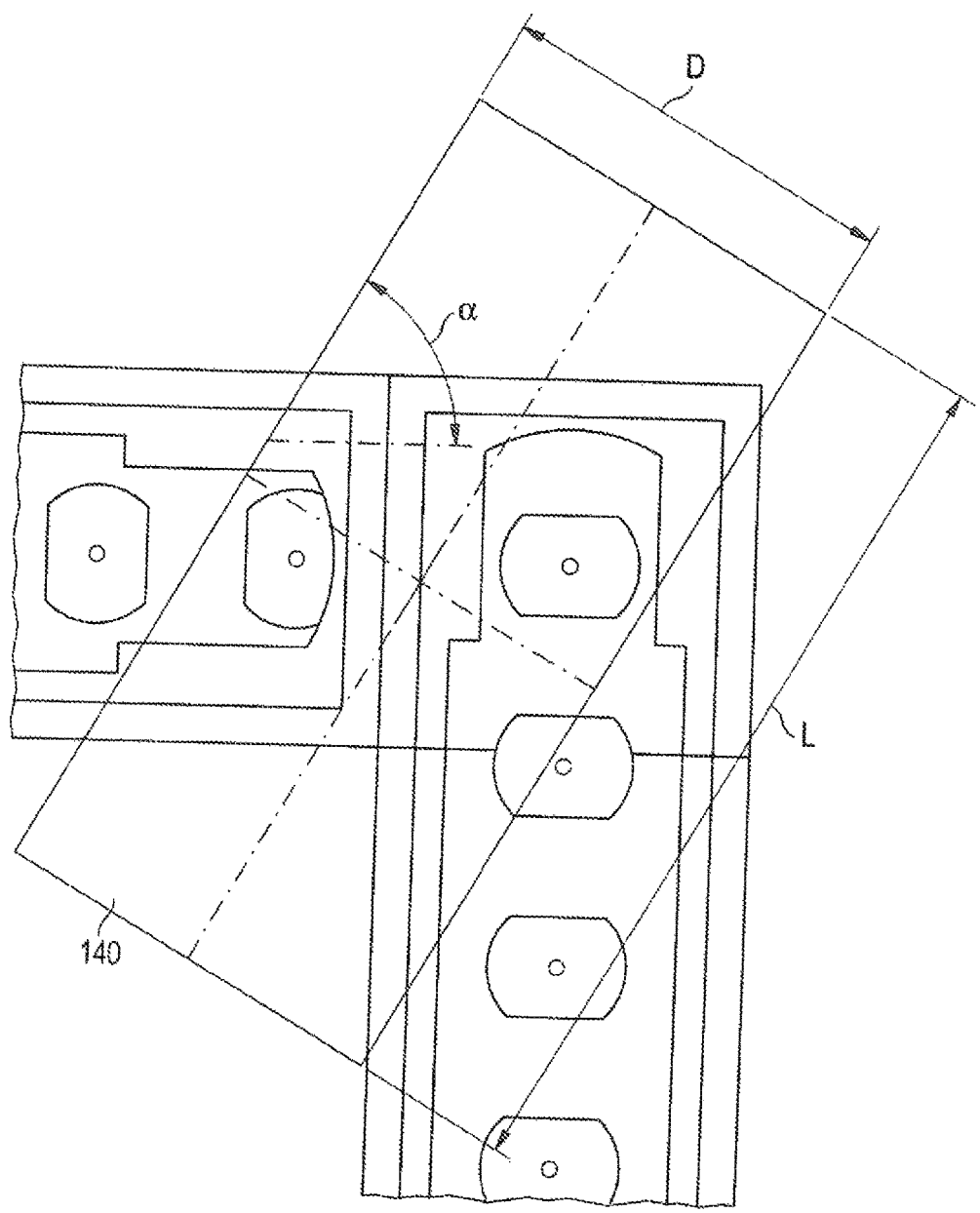
FIG. 15 shows a detail of the interface region of FIG. 10 with 30 mm diameter test rod that is rotated against the first optical unit by 60°.
Figure 16:
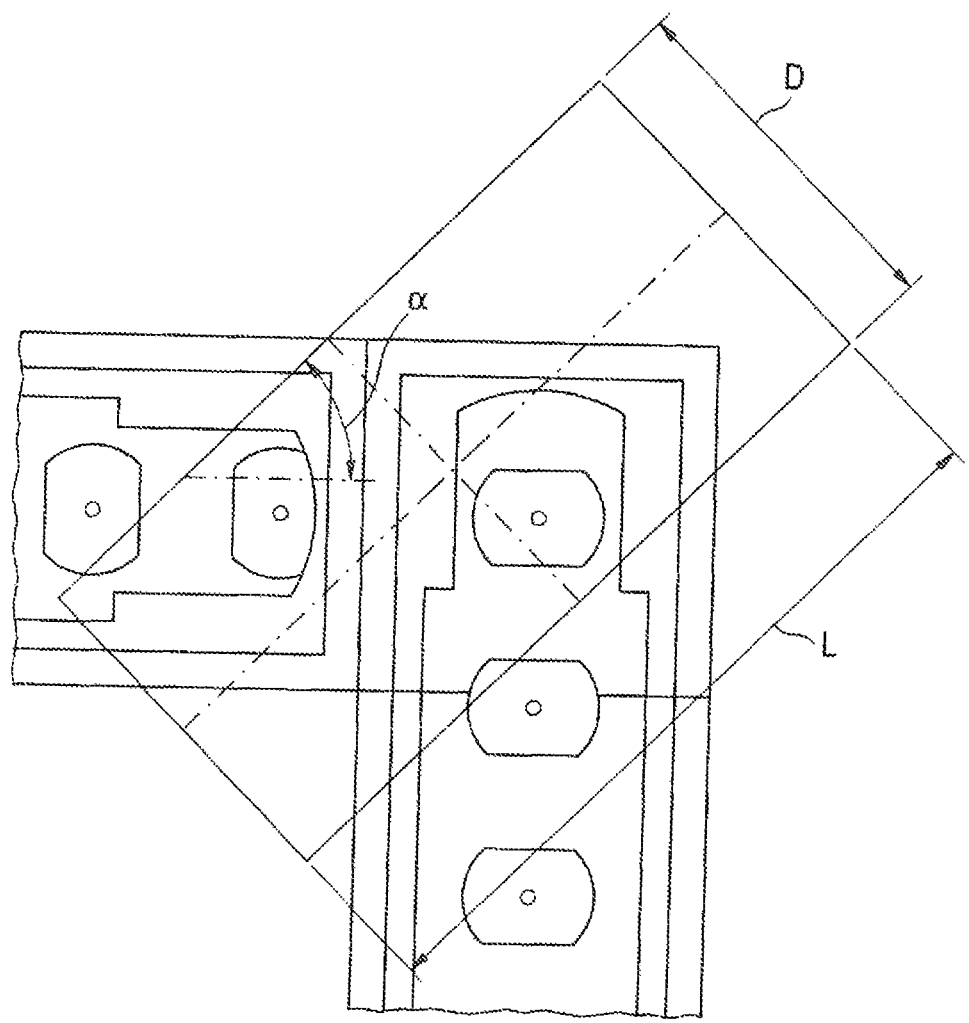
FIG. 16 shows a detail of the interface region of FIG. 10 with 30 mm diameter test rod that is rotated against the first optical unit by 45°.

FIGS. 13 to 16 show the geometry of the angular cascaded optical unit of FIG. 11 with a test rod having a diameter 0 of for instance 30 mm and a length L of for instance 60 mm. In FIG. 13 the test rod 140 includes an angle α of 90° with the common axis 144. It is important to note that with this test arrangement both peripheral transceiver elements 116b and 116c are covered and the respective radiation beams will be broken. FIG. 14 shows an angle α of 75° between the longitudinal axis of the test rod 140 and the common axis 144. FIGS. 15 and 16 accordingly show the situation for angles of 60° and 45°, respectively. In all cases, the transceiver element 116a and 116b both stay covered by the test rod 140.

An important aspect of the present invention is the geometric arrangement of the outer housing of the optical unit according to the present invention. As already mentioned, the housing is formed by three separate parts: a U-shaped profile forming a housing body, two separate end caps 126 and a transparent cover (not shown in the figures) for protecting the electronics contained in the optical unit 105.

Figure 17:
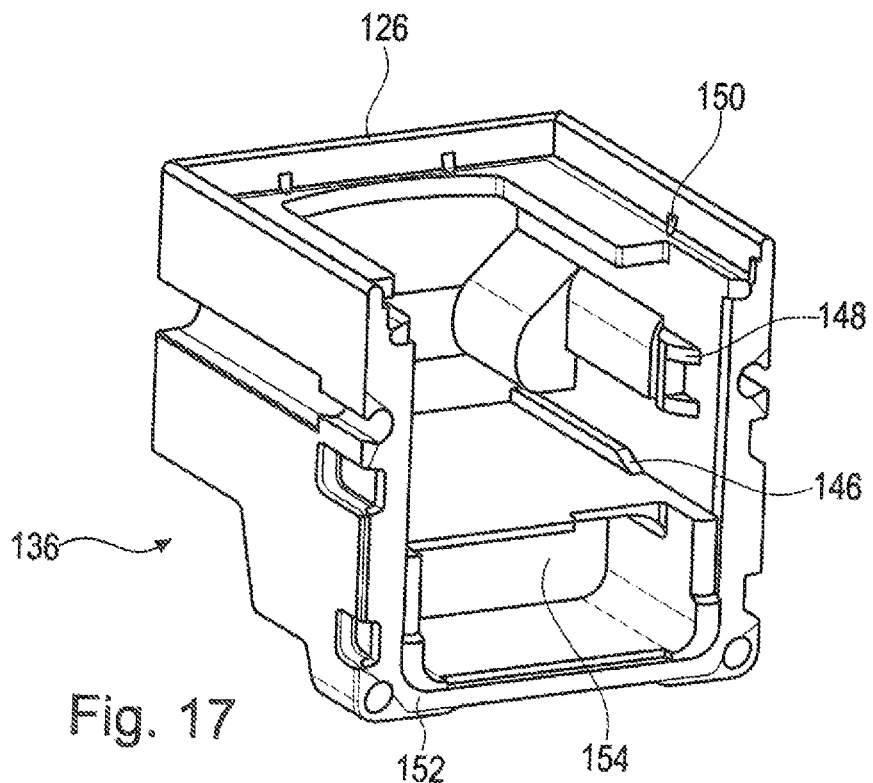
FIG. 17 shows a perspective view of an end cap for cascading optical units according to the present invention.

FIG. 17 shows a perspective view of the end cap 126 seen from the inside of the optical unit. As can be seen from FIG. 17, the end cap 126 forms the peripheral end wall of the optical unit and can be mounted in an abutting option to another optical unit for forming either a linear cascaded area 128 or an angular cascaded area 130. According to the present invention, the end cap 136 comprises means 146 for guiding a circuit board where on the transceiver elements 116 are mounted.

Moreover, a snap hook 148 is provided as a fixing means for fixing the optical module 110 or 112 within the end cap 136. By thus fixing the peripheral optical module on both ends of the optical unit, the resolution can advantageously be maintained at the specified value of 30 mm or 14 mm, even in case that temperature changes occur. Any temperature changes cause thermal expansion of the mechanical components. Due to the different materials involved, the expansion of an aluminum profile usually forming an outer housing of the optical unit 105 is different to that of the optical module 110. Without providing fixing means at the end caps, gaps would occur in the peripheral regions of the optical module 110. The optical modules 110 themselves have small tolerances to each other in order to accommodate for the thermal expansion between each other.

Centering protrusions 150 are formed at the end cap 136 in order to center the transparent cover. The contact region 152 which is pressed to the housing body advantageously may be provided with sealing means, such as an elastic layer or the like.

Furthermore, the end cap 136 comprises an opening 154 for receiving a plug-in unit (not shown in the figure).

Figure 18:
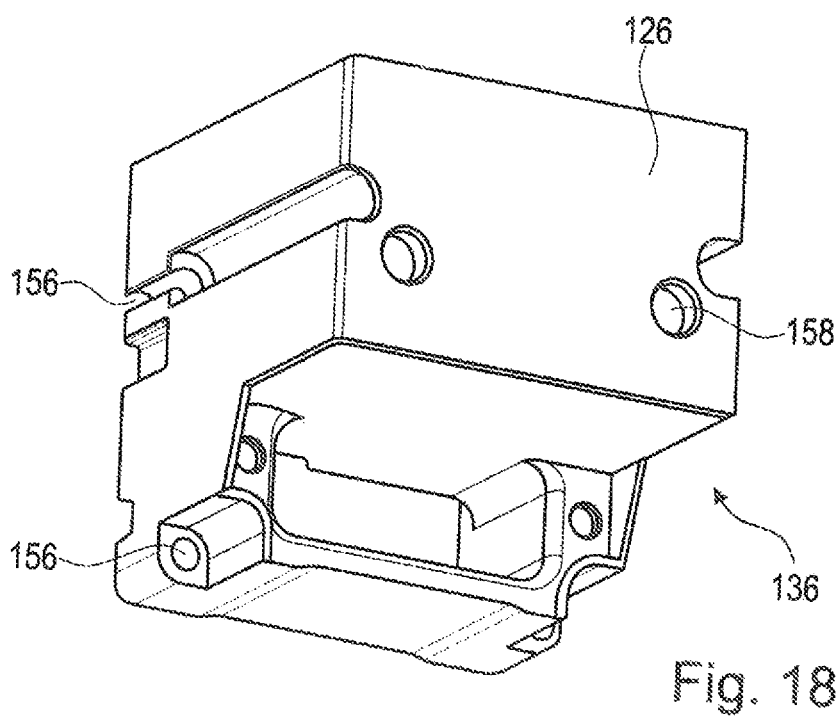
FIG. 18 shows another perspective view of the end cap shown in FIG. 17.

FIG. 18 shows the end cap 136 of FIG. 17 turned by 180°. In particular, a connection to the housing body can be performed via screw holes 156. A connection towards an abutting second optical unit can be established via the opening 158, for instance by means of bolts and a surrounding bracket.

Figure 19:
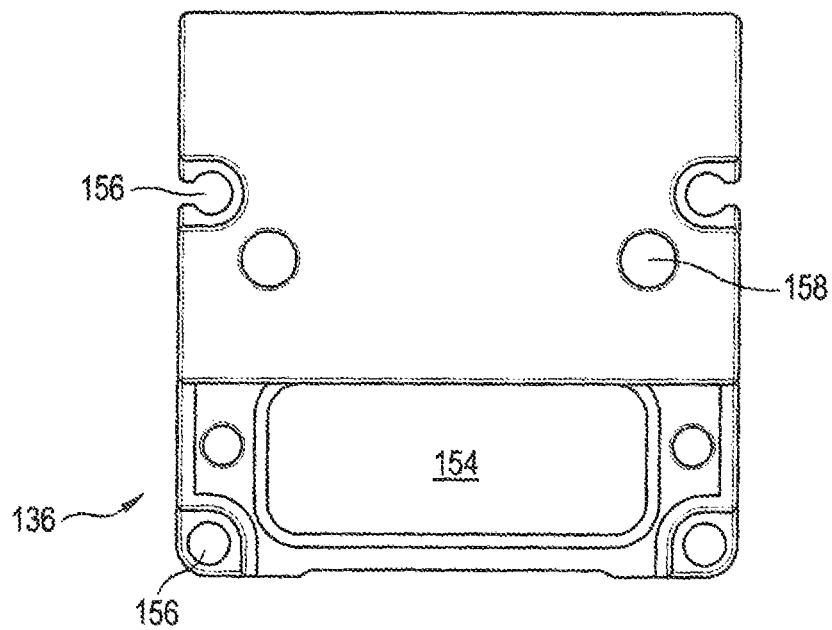
FIG. 19 shows a side view of the end cap shown in FIG. 17.
Figure 20:
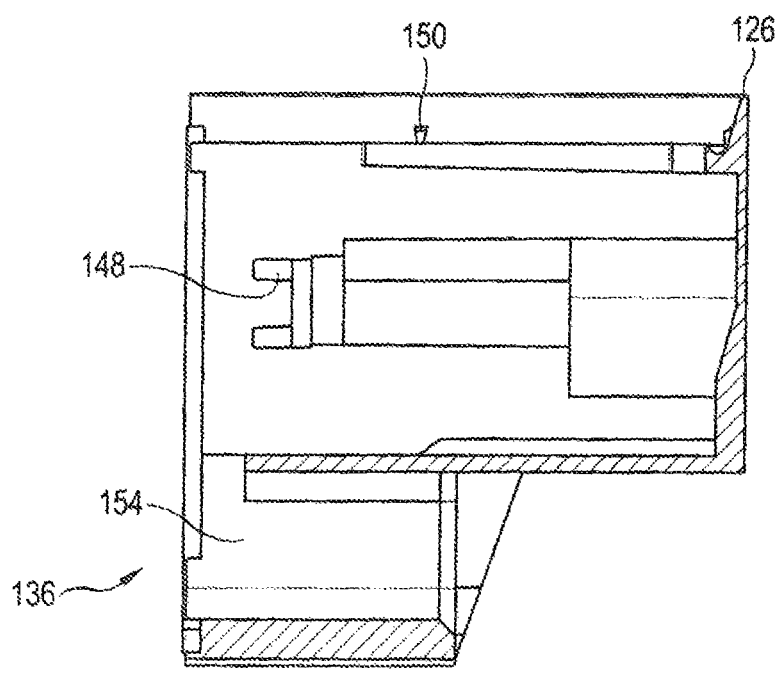
FIG. 20 shows a sectional view of the end cap shown in FIG. 17.
Figure 21:
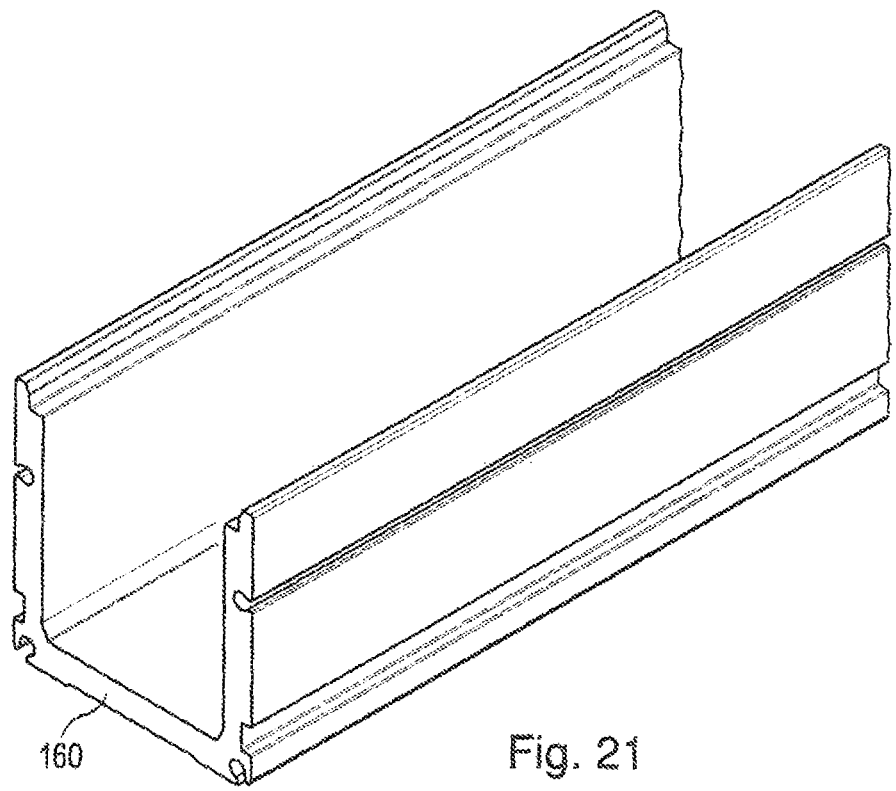
FIG. 21 shows a perspective view of a housing body.

FIGS. 19 and 20 show a plan view and a sectional view of the end cap 136 according to FIGS. 17 and 18.

Figure 22:
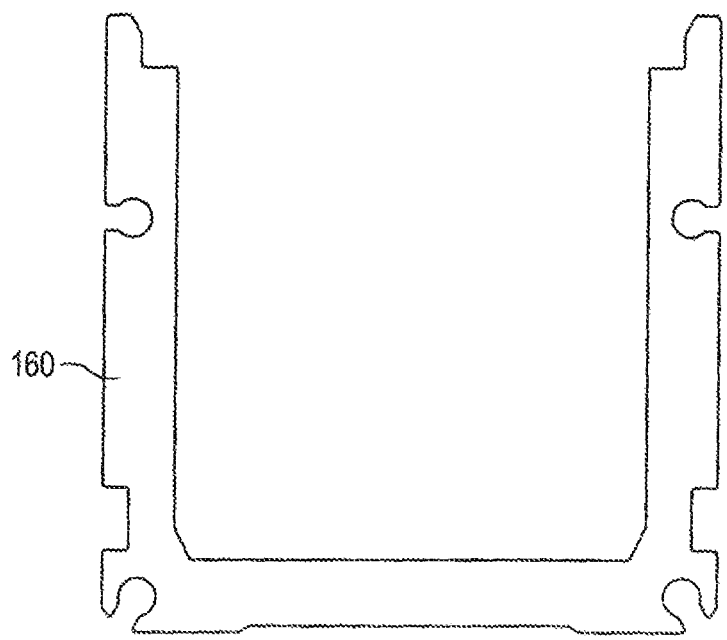
FIG. 22 shows a top view of the housing body of FIG. 21.

Advantageously, the optical unit 105 comprises a housing body 160 that is combined with two end caps 136 to form the outer housing of the optical unit according to the present invention. FIGS. 22 and 22 show an example of such a housing body 160 for encasing one or more optical units and for being closed by an end cap 136 according to the present invention. Preferably, the housing body is formed by the profile with a U-shaped cross section for instance fabricated from a metal such as aluminum. Such a housing body has the advantage of providing a mechanically stable and electrically shielding cover for the optoelectronic components inside the optical unit. Forming the peripheral regions as separate parts, namely the end caps 136, has the advantage that they can be fabricated from a much more flexible material which can be handled for the cascading process much more easily. The mechanical contact between the abutting pieces can be made much more robust and vibration tolerant.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. AU methods described herein can be performed in any suitable order unless otherwise indicated herein or otherwise clearly contradicted, by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. In particular, when referring to a light curtain, all suitable forms of radiation, e.g. visible light or infrared radiation are intended to be covered by this wording.

Moreover, any combination of the above-described elements in all possible variations thereof is encompassed by the invention unless otherwise indicated herein or otherwise clearly contradicted by context.

The invention claimed is:

1. A cascaded light curtain comprising:
   at least two first optical units, being connected to each other in an interface region to form a first rail of the light curtain, and
   at least two second optical units for being mounted opposite to said first optical units, being connected to each other to form a second rail of the light curtain,
   wherein each of said optical units comprises:
   a plurality of radiation emitting or radiation receiving elements for transmitting or receiving radiation beams forming said light curtain, and
   an elongated support element forming an outer housing of said optical unit, said support element comprising a housing body and two end caps separate from the housing body,
   wherein said support element extends along a longitudinal axis of the optical unit between two opposing peripheral regions which comprise each end cap,
   wherein each end cap is connectable in an abutting manner with another end cap of an adjacent other optical unit,
   wherein said radiation emitting or radiation receiving elements are arranged within said support element to form a row, and wherein in said row the outermost radiation emitting or radiation receiving elements are located inside one of the end caps and directly adjacent to an outer wall of at least one of said peripheral regions of the support element, and
   wherein, in the interface region, an outermost radiation emitting or radiation receiving element of one first optical unit is configured to interact with an outermost radiation emitting or radiation receiving element arranged in one of the second optical units which is not directly facing said first optical unit.

2. The cascaded light curtain according to claim 1, wherein said end cap comprises fixing means for mechanically fixing two optical units at each another.

3. The cascaded light curtain according to claim 1, wherein said radiation emitting or radiation receiving elements are assembled on at least one optical module mounted within said support element, and wherein said end cap directly accommodates a distal part of the optical module arranged in the peripheral region.

4. The cascaded light curtain according to claim 1, wherein said end caps further comprises connecting means for electrically interconnecting at least two optical units.

5. The cascaded light curtain according to claim 4, wherein said connecting means comprise a plug-in element which is received in an opening of the end cap and is electrically connected to an electronic circuit carrier arranged within said support element.

6. The cascaded light curtain according to claim 1, wherein said at least two first optical units are connected with each other to form said first rail either straight or angled, and wherein said at least two second optical units are connected with each other to form said second rail corresponding to said first rail.

7. The cascaded light curtain according to claim 1, wherein a resolution between the peripheral radiation emitting or radiation receiving elements of two abutting optical units is equal to a resolution between adjacent radiation emitting or radiation receiving elements within the same optical unit.

8. The cascaded light curtain according to claim 1, wherein abutting optical units are fixed at each other via end caps which are provided at the peripheral region of each of said abutting optical units.

9. The cascaded light curtain according to claim 8, wherein said end caps are connected to each other by means of a bracket attached to each of the abutting end caps.

10. The cascaded light curtain according claim 1, wherein each optical unit comprises a row of transceiver elements, each comprising a radiation receiving element and a radiation emitting element.

11. The cascaded light curtain according to claim 10, wherein for forming an L-shaped rail one optical unit is attached to another optical unit so that a peripheral end of one support element is abutting to an end region of a side wall of the other support element, and wherein for each of said optical units the distance between the peripheral ones of said transceiver elements and the peripheral wall of said support element is different for the two ends of each optical unit.

12. The cascaded light curtain according to claim 1, wherein the end caps form three of the outer walls of said peripheral regions, the outer walls including an angle with respect to one another.

13. The optical unit according to claim 12, wherein the angle is 90°.

14. A method for cascading optical units of a light curtain monitoring a protective field, said light curtain comprising:
   two first optical units, each comprising a plurality of radiation emitting or radiation receiving elements for transmitting or receiving radiation beams, the first optical units being connected to each other in an interface region to form a first rail of said light curtain,
   two second optical units for being mounted opposite to said first optical units, each comprising a plurality of radiation emitting or radiation receiving elements for transmitting or receiving radiation beams, the second optical units being connected to each other to form a second rail of said light curtain, elongated support elements forming outer housings of said optical units, said support elements comprising a housing body and two end caps separate from the housing body, wherein said support elements extend along a longitudinal axis of the optical unit between two opposing peripheral regions which comprise each end cap, said method comprising the step of arranging said optical units in an abutting configuration to form the first and second rails of the light curtain, so that a resolution between peripheral radiation emitting or radiation receiving elements of the two abutting optical units is essentially equal to a resolution between adjacent radiation emitting or radiation receiving elements within the same optical unit, and configuring, in the interface region, an outermost radiation emitting or radiation receiving elements located inside an end can of one first optical unit to interact with an outermost radiation emitting or radiation receiving elements located inside an end cap arranged in one of the second optical units which is not directly facing said first optical unit.

* * * * *